Patented Aug. 26, 1930

1,774,341

UNITED STATES PATENT OFFICE

HANS VON HALBAN AND OSKAR SCHOBER, OF FRANKFORT-ON-THE-MAIN, GERMANY, ASSIGNORS TO METALLGESELLSCHAFT AKTIENGESELLSCHAFT, OF FRANKFORT-ON-THE-MAIN, GERMANY

ACTIVE CARBON PRODUCT AND PROCESS FOR PREPARING SAME

No Drawing. Application filed June 1, 1927, Serial No. 195,860, and in Germany June 12, 1926.

Heretofore it has been the generally accepted belief of those versed in the active carbon art that active carbon products are characterized by high carbon content, and further, that the purity of the products, with respect to carbon, is directly proportional to their activity. Prior methods of making active carbon products have pointed to or borne out this belief. For instance, it has been customary either to select for the preparation of active carbon products starting materials, such as wood charcoal, cocoanut shell carbon and the like, which are low in mineral or ash-forming constituents, or to treat the activated material for the removal of ash, for instance, by washing with acid, or both. The preparation of active carbon products therefore has been rather troublesome and expensive, and due to the loss of carbon by oxidation during the activating process and the removal of ash by washing, the yields of active carbon products have been relatively low.

Heretofore it has been considered that an active carbon product should contain upward of 90% of carbon or conversely less than 10% of acid-soluble ash constituents. Analysis of numerous active carbon products has shown an acid-soluble ash content always very materially below 20%.

The present invention is based upon the discovery that high carbon or conversely low acid-soluble ash content is not essential to high activity. We have found that a product of high activity or adsorptive capacity may contain more than 20%, for instance, 30% to 40%, and even up to as high as 80% or even 90% of acid-soluble ash derived from mineral or ash-forming constituents of the starting material and moreover that the activity of a product having such a high acid-soluble ash content derived from the starting material is greater than the activity of the product obtainable therefrom by removing the ash content by washing with acid. Carrying the line reasoning indicated by these discoveries to its logical conclusion, it has been demonstrated by carrying the activating operation to the point at which only ash is left, that the activity of the product is not inherent in the ash. The ash, from which practically all carbon has been removed by an activating oxidation, is of very low activity. The system carbon + ash within limits which may be roughly defined as extending from 90% carbon—10% ash to 10% carbon—90% ash has an activity which is materially greater than the sum of the activities of the carbon and the ash as determined by removing the ash and measuring the activity of the carbon and by removing all of the carbon and measuring the activity of the residual ash. These discoveries open the way to the economical preparation of active carbon products directly and without treatment for the removal of ash from inexpensive starting materials, such as coal, brown coal, crude coke, peat, etc., and mixtures thereof which are rich in acid-soluble-ash-forming constituents. It will be understood that the present invention is distinguished from the preparation of mixtures of active carbon and other materials, such as silica or silicates, which may or may not have adsorptive properties but are not acid-soluble ash derived from the starting material.

In order that the products of the present invention may be clearly defined and distinguished from prior products the following facts are given: Our products, having an activity characteristic of active carbon products to be defined hereinafter do not, as has heretofore been regarded as essential, necessarily contain upwards of 90% of carbon or more accurately less than 10% of acid-soluble ash. Our products in general contain from 20% upward to 90% of acid soluble ash. The presence of ash which is not soluble in acid along with the acid-soluble ash is not excluded. Our products have an apparent density of less than 0.6, that is, one liter of the product, pulverized so that the average grain measures about 0.1 millimeter compacted by shaking weighs at most about 600 grams.

Active carbon as distinguished from ordinary decolorizing carbons, such as bone black, may be defined in several ways, for instance, by reference to its decolorizing action as compared with that of bone black, and by its absolute decolorizing power with respect to standard molasses solution. These methods may be employed not only for distinguishing what is known as active carbon from other forms of carbon but for determining the relative activity thereof.

For determining the activity of a carbon in decolorizing a standard molasses solution the method consists in preparing a normal or standard molasses solution by diluting a measured quantity of commercial molasses from the beet sugar process with water until a coloring of 20° Stammer (cf. Frühling-Rössing, Untersuchung der Rohstoffe der Zuckerindustrie (1919), p. 164) is obtained. To obtain this degree of coloration from common commercial molasses it is usually necessary to dilute about 55 grams of the molasses to 1 liter. Since commercial molasses usually contains about 74.5% of dry solids and has a specific gravity of about 1.38, a solution having a coloration of 20° Stammer, i. e., 55 grams of commercial molasses diluted to 1 liter of solution, contains about 4% of dry solids. Small variations in the composition of the molasses solution having a coloration of 20° Stammer do not materially affect the results in the use of the solution for testing the activity of a decolorizing carbon product. The diluted molasses solution is then shaken with 1 gram of kieselguhr per liter of solution and filtered and is then ready for use. The so prepared molasses solution should be used within 3 or 4 hours and preferably is used directly after it is prepared and before any alteration occurs. In testing a decolorizing carbon product a measured quantity of the product is agitated with a measured quantity of the molasses solution held at a temperature of 80° C. for about 10 minutes and then filtered and the solution examined with a colorimeter, for instance a Dubosq colorimeter, to determine the degree of decolorization. The activity of the carbon is measured by the quantity required to produce a 60% decolorization in 100 cubic centimeters of the standard molasses solution. The quantities of commercial active carbon products of high carbon content required to produce a 60% decoloration range from 0.2 to 1.5 grams. The average high grade and expensive decolorizing carbons run in the neighborhood of 0.75 grams. Active carbon products therefore may be defined with reference to the foregoing test as products of which at most 1.0 gram is required to produce a 60% decolorization of 100 cubic centimeters of a standard molasses solution.

By reference to bone black, active carbon products may be defined as being products having at least twice the decolorizing activity of bone black, that is, not more than half as much of the active carbon product as of bone black is required to produce a given decolorization provided that before testing the bone black is ground to the same degree of fineness as the active carbon product. Our products usually are at least five times or from five to eight times as active as decolorizing agents, as bone black when tested by the standard molasses solution method described above.

It is noted at this point that heretofore no active carbon product containing as high as 20% of acid-soluble ash and having a decolorizing power as measured by the standard molasses solution test within the range from 0.2 to 1.5 has been known.

The active carbon products of our invention may be prepared in various ways involving numerous modifications of the well known oxidation activation process. For instance, the starting material which may be a carbonaceous material which is relatively rich in acid-soluble-ash-forming constituents, such as bituminous coal, coke from coal, coke from peat, and the like, may be treated with an oxidizing gas mixture at a temperature of 500° C. to 800° C. until the product contains more than 20%, for instance, 30% to 90% of ash which is soluble in hydrochloric acid. As the oxidizing gas there may be used oxygen or oxygen-containing gases such as air or gases containing oxygen in chemical combination or capable of liberating oxygen such as carbon dioxide, steam, chlorine or the like. Mixtures of such oxidizing gases with each other and/or with inert diluting gases such as nitrogen may be employed. The temperature to be employed in the activating process depends upon the nature of the oxidizing gas or mixture used. For instance, when using steam (water vapor) alone temperatures of 950° C. to 1100° C. are required, whereas when using a gas containing elemental oxygen, such as a mixture of oxygen and nitrogen, or a mixture of oxygen, nitrogen and steam, lower temperatures, such as 500° C. to 800° C. are sufficient. For example, one may treat the carbonaceous material in a suitable apparatus such as a rotary furnace at about 600° C. to 700° C. with a mixture of equal parts of air and steam until the loss in weight calculated upon the weight of the dry starting material is more than 40%, for example 50% to 85%. In many instances the best results are obtained by carrying on the activation until the loss of weight is from 70% to 80%. In general it has been found to be most advantageous to use an oxidizing gas mixture, the partial pressure of the oxygen content of which is from 8 m. m. to 115 m. m. of mercury, or in which the oxygen amounts to from 1% to 15% of the volume of the mixture at atmospheric pressure. The mixture of equal parts of air and steam, referred to above, contains 10% by volume of oxygen. The oxygen content of the gas mixture should in general not exceed 15%. In general the lower the pressure under which the activation is carried out the higher may be the oxygen content of the oxidizing gas mixture and the oxygen content of the gas also is correlated with the temperature at which the activation is carried out, following the rule that the higher the temperature the lower should be the oxygen content of the gas. For example, in activating brown coal at a temperature of about 700° C. the gas mixture should contain from 2% to 6% by volume of oxygen while in activating brown coal at 600° C. the gas mixture should contain 6% to 11% by volume of oxygen.

As the diluent in the oxidizing gas mixture one may use nitrogen or nitrogen and carbon dioxide or nitrogen, carbon dioxide and steam. If the diluting gas takes any part in the reaction as does steam and carbon dioxide, under some circumstances, then the elemental oxygen content of the gas mixture must be lowered accordingly. Or, as is indicated above, the oxygen partial pressure in the gas mixture can be lowered by lowering the pressure under which the oxidizing gas mixture is applied in the activating operation. The best conditions of operation including the temperature, the composition of the oxidizing gas, the rate of gas flow and the extent to which the oxygen content of the carbonaceous material is consumed are best determined by experimentation upon small batches of material. In some cases it is advantageous to increase the temperature at which the activation is carried out near the end of the activating operation, for instance, when the activation is carried out at a temperature of 650° C., it is advantageous to increase the temperature during the last 15 minutes to about 1000° C. Another advantageous expedient is to decrease the oxygen content of the oxidizing gas mixture near the end of the activating operation until the carbonaceous material is finally heated for a short time in a gas free of elemental oxygen, for instance, steam alone. The starting material may be previously coked or charred in a separate operation or the coking as of peat and the activation may be accomplished in a single continuous operation in the same reaction vessel.

Instead of using as the oxidizing gas especially prepared mixtures of air, steam, etc., one may use waste gas mixtures, such as products of combustion from heating furnaces, provided that they are free of deleterious impurities. Or the oxidizing gas may be produced outside of or even within the vessel within which the activation is carried out by the combustion of fuel gas. For instance, one may supply a suitable mixture of producer gas consisting essentially of nitrogen and carbon monoxide with air and steam to the activating vessel, for instance, a rotary furnace, where the mixture is burned and the products of combustion serve as the oxidizing or activating gas and the heat generated by the combustion serves to produce the desired activating temperature.

Our process has the advantages that it is simple and inexpensive to carry out on a large scale; that it employs inexpensive starting materials and avoids the expensive washing with acid to remove ash; and that it is carried out at relatively low temperatures and therefore is not destructive to the apparatus used. Our process usually involves the use of temperatures well below 1000° C., whereas previous activating processes usually involve the use of temperatures approximating or even exceeding 1000° C. The active carbon products made in accordance with our invention are inexpensive, are characterized by a high acid-soluble ash content coupled with an activity comparable with that of high grade active carbon products of relatively low acid-soluble ash content, and are suitable for use for decolorizing, the adsorption of gases and vapors, the separation of gas mixtures, and for catalytic purposes and other uses where activated carbon may be applied.

We claim:

1. An active carbon product containing from about 20% to about 90% of ash derived from the carbonaceous starting material, which ash is soluble in dilute hydrochloric acid.

2. An active carbon product containing at least about 20% of ash derived from the carbonaceous starting material, which ash is soluble in dilute hydrochloric acid, and at least about 10% of carbon.

3. Process for the production of an active carbon product which comprises subjecting a corbonaceous material to the action of an oxidizing gas at a temperature of at least about 500° C. until the material loses at least 40% by weight.

4. Process for the production of an active carbon product which comprises treating a corbonaceous material with an oxidizing gas having an elemental oxygen partial pressure of from 8 m. m. to 115 m. m. of mercury at 500° C. to 800° C. until at least 40% by weight of said material is consumed.

In testimony whereof, we affix our signatures.

HANS VON HALBAN.
OSKAR SCHOBER.